US008947741B2

(12) United States Patent
Suzuki et al.

(10) Patent No.: US 8,947,741 B2
(45) Date of Patent: Feb. 3, 2015

(54) CONVERTING COLOR VALUES OF PRINT DATA INTO COLOR SPACE OF PRINT APPARATUS AND PRODUCING NEW OBJECT FROM OVERLAP PORTION OF PLURAL OBJECTS TO SUPERIMPOSE THEREON WITH KNOCK-OUT METHOD (71) Applicant: Fuji Xerox Co., Ltd., Tokyo (JP)

(72) Inventors: Yuji Suzuki, Yokohama (JP); Takuya Ohta, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 39 days.

(21) Appl. No.: 13/760,572

(22) Filed: Feb. 6, 2013

(65) Prior Publication Data
US 2014/0078526 A1    Mar. 20, 2014

(30) Foreign Application Priority Data

Sep. 18, 2012    (JP) .................................. 2012-204544

(51) Int. Cl.
H04N 1/387    (2006.01)
H04N 1/60    (2006.01)
G06K 15/02    (2006.01)

(52) U.S. Cl.
CPC ........ G06K 15/1878 (2013.01); G06K 15/1825 (2013.01); G06K 15/1888 (2013.01); H04N 1/387 (2013.01); G06K 15/1848 (2013.01)
USPC ........................... 358/3.26; 358/518; 358/538

(58) Field of Classification Search
None
See application file for complete search history.

(56) References Cited

U.S. PATENT DOCUMENTS

| 7,505,048 | B2 | 3/2009 | Su |
| 7,519,899 | B2* | 4/2009 | Foehr et al. .................... 715/200 |
| 7,692,231 | B2* | 4/2010 | Suh ................................ 257/296 |
| 7,733,527 | B2* | 6/2010 | Miyazaki ....................... 358/1.9 |
| 8,024,648 | B2* | 9/2011 | Foehr et al. .................... 715/200 |
| 8,259,349 | B2* | 9/2012 | Cairns ............................ 358/1.9 |
| 8,503,023 | B2* | 8/2013 | Nishide ........................ 358/1.18 |
| 2006/0274974 | A1 | 12/2006 | Nishikawa et al. |
| 2013/0120381 | A1* | 5/2013 | Lau et al. ....................... 345/423 |

FOREIGN PATENT DOCUMENTS

EP    0 705 024 A2    4/1996
JP    2005109987 A    4/2005

(Continued)

OTHER PUBLICATIONS

Office Action, dated May 16, 2014, issued by the Australian Patent Office in counterpart Australian Patent Application No. 2013201186.

*Primary Examiner* — Scott A Rogers
(74) *Attorney, Agent, or Firm* — Sughrue Mion, PLLC (57) ABSTRACT An image processing unit, includes: an overlap portion detection unit that detects an overlap portion between plural objects from image data configured by objects expressed by geometrical information and color values; a color value calculation unit that for the overlap portion between the plural objects, calculates a color value of the overlap portion from the plural objects according to an overlap processing method of the overlap portion; an object producing unit that produces a new object from the overlap portion between the plural objects detected by the overlap portion detection unit, and the color value calculated by the color value calculation unit; and a control unit that controls the object produced by the object producing unit to be superimposed on the overlap portion between the plural objects with a knock-out method.

7 Claims, 8 Drawing Sheets (56) References Cited

FOREIGN PATENT DOCUMENTS

| JP | 2006303679 A | 11/2006 |
| JP | 2006345097 A | 12/2006 |
| JP | 200782065 A | 3/2007 |
| JP | 201214586 A | 1/2012 |

* cited by examiner

CONVERTING COLOR VALUES OF PRINT DATA INTO COLOR SPACE OF PRINT APPARATUS AND PRODUCING NEW OBJECT FROM OVERLAP PORTION OF PLURAL OBJECTS TO SUPERIMPOSE THEREON WITH KNOCK-OUT METHOD

CROSS-REFERENCE TO RELATED APPLICATIONS

This application is based on and claims priority under 35 USC 119 from Japanese Patent Application No. 2012-204544 filed on Sep. 18, 2012.

BACKGROUND

1. Technical Field

The present invention relates to an image processing apparatus and a computer readable medium.

2. Related Art

As a print image processing when a separate object is superimposed on a back side object, there are known a knock-out, an overprinting and a transparency processing. In the knock-out, a color value of an overlap portion where both objects are overlapped with each other is turned to the color value of the superimposed (i.e., front side) object, and the color value of the back side object is not reflected. Whereas, in the overprinting or transparency processing, the color value of the overlap portion is turned to a value in which the color values of both objects are reflected.

When printing, a color value designated among print data is color-converted into a color value adapted to a color space in a print apparatus (i.e., in which a color reproducing characteristic of the print apparatus is reflected), and then supplied to the print apparatus.

However, the color conversion is not linear. For this reason, the color of an overlap portion where objects are overlapped with each other by the overprinting or transparency processing generally becomes different between a case where the objects are individually color-converted and then overlapped with each other and a case where the overlapped color prior to the individual color conversion is color-converted.

SUMMARY

According to an aspect of the invention, an image processing unit includes: an overlap portion detection unit that detects an overlap portion between plural objects from image data configured by objects expressed by geometrical information and color values; a color value calculation unit that for the overlap portion between the plural objects, calculates a color value of the overlap portion from the plural objects according to an overlap processing method of the overlap portion; an object producing unit that produces a new object from the overlap portion between the plural objects detected by the overlap portion detection unit, and the color value calculated by the color value calculation unit; and a control unit that controls the object produced by the object producing unit to be superimposed on the overlap portion between the plural objects with a knock-out method.

BRIEF DESCRIPTION OF THE DRAWINGS

Exemplary embodiment(s) of the present invention will be described in detail based on the following figures, wherein.

DETAILED DESCRIPTION

Figure 1:
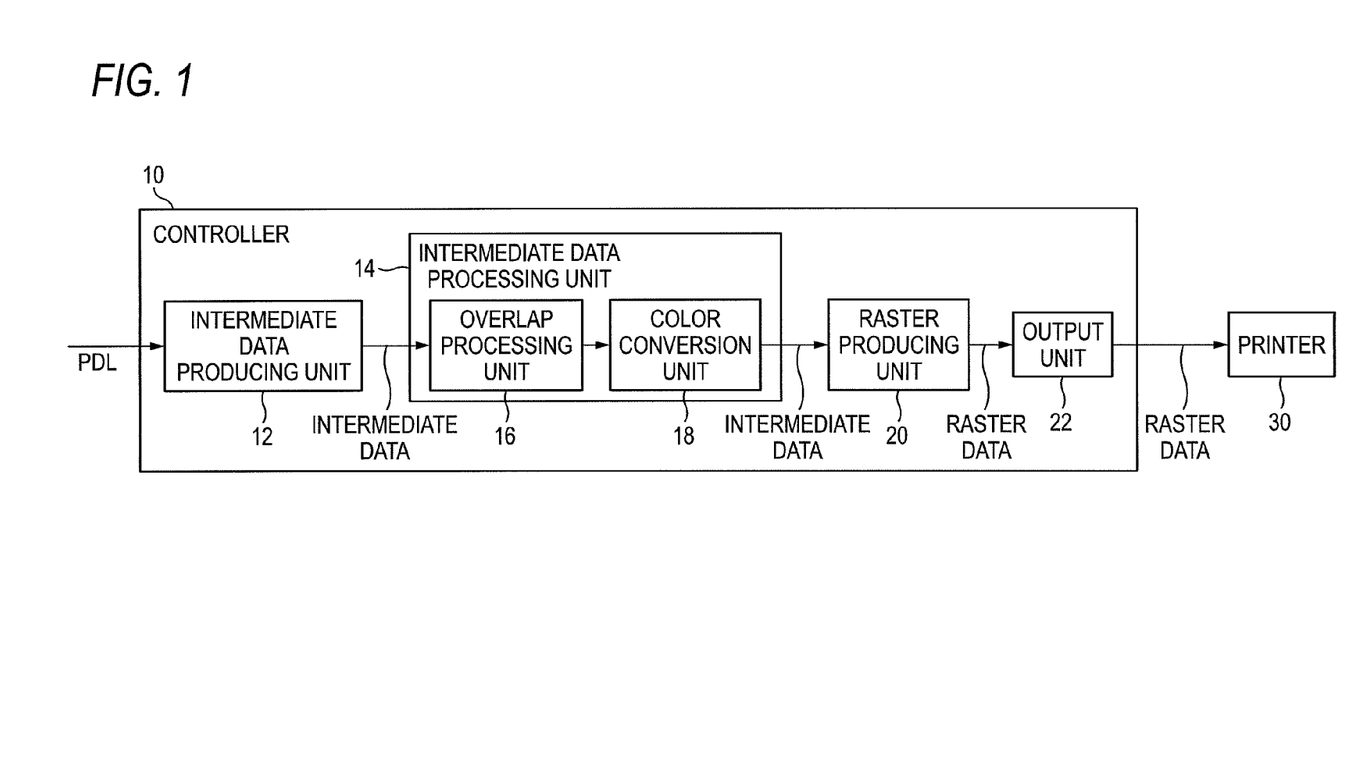
FIG. 1 is a view illustrating an example of a system configuration of an exemplary embodiment.

Hereinbelow, exemplary embodiments of the present invention will be described with reference to drawings. FIG. 1 illustrates a configuration of a controller 10 of the present exemplary embodiment. The controller 10 is a device that receives print data described by page description language (PDL), such as PostScript (registered trademark) or Portable Document Format (PDF), from a host computer or the like, and converts the print data into raster image data which can be handled by a printer 30.

An intermediate data producing unit 12 in the controller 10 converts the print data described with the PDL into intermediate data which has a data format corresponding to an intermediate level between data formats of the PDL data and the raster image data.

The format of the intermediate data is not especially limited. An existing data format or an intermediate data format to be developed from now on may be used.

For example, there is a method of expressing an object described by the PDL as a gathering of plural rectangular fine objects which are surrounded by sides parallel to raster scan lines in raster image data and sides perpendicular to the raster scan lines. This method is called a "run list" format, and a rectangular fine object is called a "run". In this method, each run in the intermediate data includes information representing the shape and size of the run (for example, a pair of coordinates of two apexes on the diagonal lines of the run, i.e. the rectangular shape), and a pixel value property of the run. When the run is, for example, a character or graphics, the pixel value property is a pixel value (for example, a concentration value), and when the run is a continuous tone image, the pixel value property is an address of an image mapped to the run or the like (that is, the image body is stored in a separate location in this example).

In addition, in the intermediate data of the run list format, as property information of a single object obtained by binding the runs, information representing the type of the object (character, graphics, a continuous tone image, etc.), information representing a method of overlapping the object with a back side object (knock-out, overprinting, or transparency processing), information specifying a bounding box of the object, etc. are included. Meanwhile, the properties, such as the type of an object or the presence/absence of an overprinting, may be included in the data of each run in the object. The bounding box is a rectangular region (each side of which is parallel to horizontal or vertical direction of a page) that encloses the object, and for example, in the PDL data, information specifying the bounding box (for example, the coordinates of the apexes of the left top and right bottom of the bounding box) is set as the property information for the object. The information of the bounding box in such PDL data needs only to be incorporated in the intermediate data.

The run list format is merely an example, and of course, another format, such as, for example, a display list, may also be used. For each object included in a page (an object defined by the data format of the intermediate data which may not be the same as an object of the PDL data), the intermediate data needs only to define geometric information and a color value (pixel value) of the object (i.e., information representing the shape, size and position in the page of the object). Because the intermediate data format is closer to the raster format than the PDL even though any format may be used, the calculation of the geometric information of the overlap portion of the objects can be executed in a high speed as compared to a case where the PDL is directly handled.

The intermediate data producing unit 12 produces intermediate data which is divided for each of color plates (e.g., each of C, M, Y and K plates) from the PDL print data.

The intermediate data of, for example, each color plate of each page, which is output from the intermediate data producing unit 12, is input to an intermediate data processing unit 14. The intermediate data processing unit 14 performs a flattening processing and a color conversion processing for the intermediate data to adapt the intermediate data for a color space of the printer 30.

The flattening processing is a processing for determining a color value concerning an overlap portion where plural objects are overlapped with each other based on the color value of each of the objects. A method of calculating the color value of the overlap portion at the time of flattening is determined based on the method of overlapping the objects (e.g., knock-out, overprinting, and transparency processing). For example, in the case of the knock-out, the color value of the object overlapped in the front side is employed as a color value of the overlap portion, and the color value of the back side object is not reflected. However, in the case of the overprinting and the transparency processing, the color of the back side object is reflected to the color of overlap portion. The overprinting and the transparency processing are different from each other in that the former reflects the concentration value of the back side object to the overlap portion only for a color plate in which the front side object has no value (that is, the concentration value is 0), whereas the latter also reflects the concentration value of the back side object to the overlap portion for a color plate in which the front side object has a value (that is, the concentration value is larger than 0 (zero)). That is, as methods for determining the color value of an overlap portion in the overprinting and the transparency processing, for example, the followings are known. That is, in the case of the overprinting, for a color plate in which the concentration value of the front side object is 0, the concentration value of the back side object is employed, and for a color plate in which the concentration value of the front side object is larger than 0 (zero), the concentration value of the front side object is employed. In the case of the transparency processing, the concentration value of the back side object and the concentration value of the front side object of each color plate are converted into values of an additive color process (regardless of whether the concentration value of the front side object is 0 or not), and then multiplied, and the multiplied result is converted into a concentration value of a subtractive color process, thereby obtaining the concentration value of the overlap portion (however, this is the case where a color value of intermediate data is that of the subtractive color process. For a color value of the additive color process, the conversion is not required). Of course, the overprinting and the transparency processing are not limited to this example. As another example, in the overprinting or the transparency processing, mixing ratios are set for the back side and front side objects, respectively, and a result obtained by performing a weighted summation of the colors of the front side and back side objects may be employed as a color of the flattening result. Anyway, the overprinting and the transparency processing are different from the knock-out in the common feature thereof that the color of the back side object is reflected to the color of the overlap portion.

The intermediate data processing unit 14 performs the flattening processing and color conversion in the level of the intermediate data. That is, the intermediate data processing unit 14 processes input intermediate data and outputs the flattening and color conversion terminated intermediate data. For this processing, the intermediate data processing unit 14 includes an overlap processing unit 16 and a color conversion unit 18.

The overlap processing unit 16 is a module for performing the flattening processing of the objects intactly based on the intermediate data. More specifically, the overlap processing unit 16 produces a new object that represents the overlap portion between the objects in the input intermediate data, and adds the new object with a knock-out designation.

This processing concept will be described using FIGS. 2 and 3.

Figure 2:
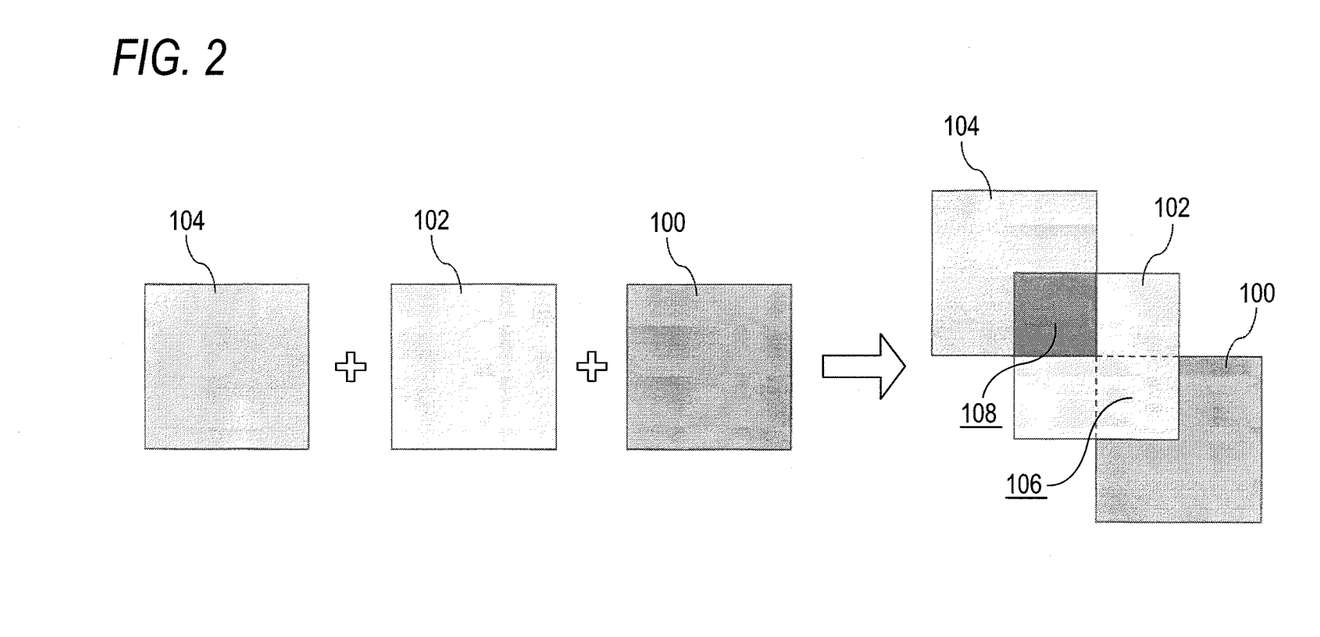
FIG. 2 is a view for describing an outline of a processing of an exemplary embodiment.
Figure 3:
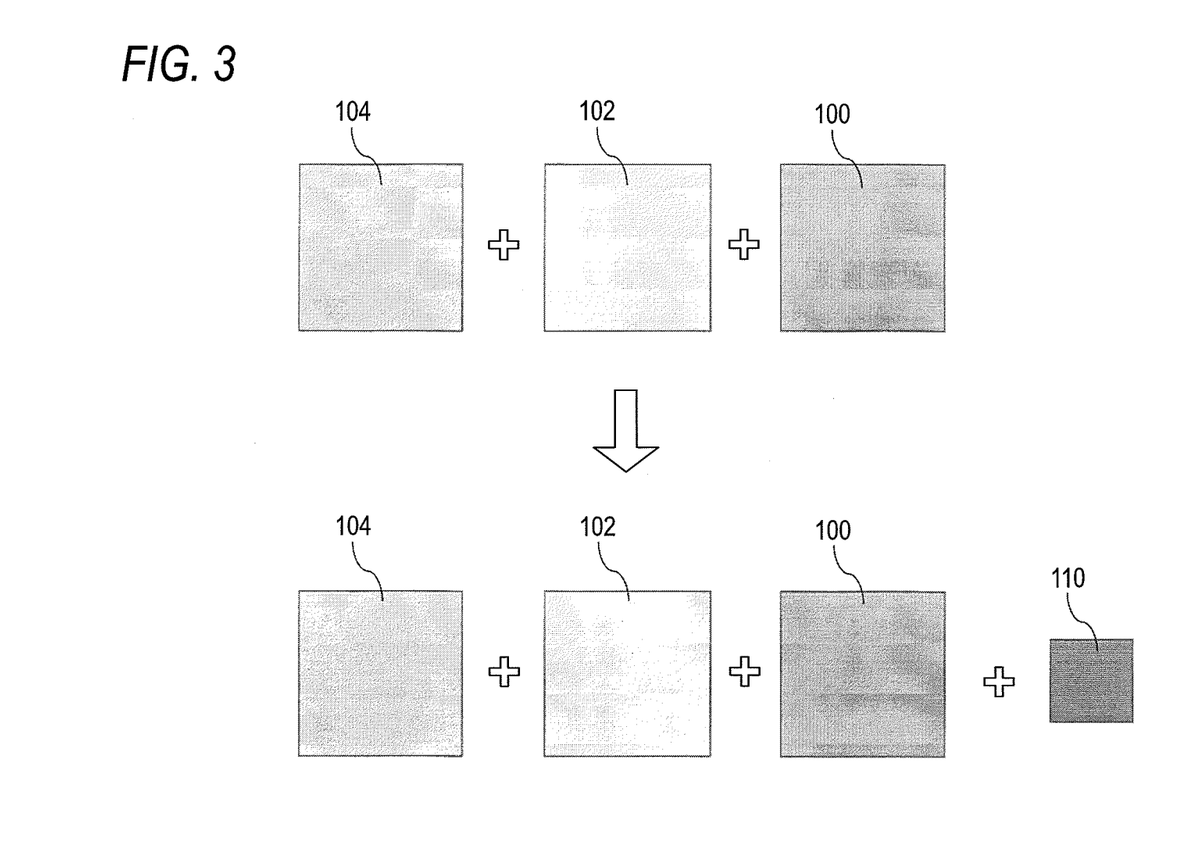
FIG. 3 is a view for describing an outline of a processing of an exemplary embodiment.

FIGS. 2 and 3 illustrate an example of an overlap state of three objects. In this example, in a page, three square objects 100, 102 and 104 depicted in the left side of FIG. 2 are overlapped with each other as depicted in the right side. In this example, the fourth quadrant of the object 102 (one quarter in the right lower part) is superimposed on the second quadrant of the object 100 (one quarter in the left upper part) with the knock-out designation, and the fourth quadrant of the object 104 is superimposed on the second quadrant of the object 102 with an overprinting (or transparency processing) designation. In this example, the color of the overlap portion 106 where the object 102 is superimposed on the object 100 is turned to a color which is the same as that of the object 102 because the knock-out is designated for the overlap portion. However, the overlap portion 108 where the object 104 is superimposed on the object 102 is turned to a color in which the color of the back side object 104 is reflected in the color of the front side object 104 because the overprinting is designated for the overlap portion 108, and hence is different from those of the superimposed object 104 and the back side object 102. For this reason, in a color conversion when performing a flattening subsequently, the color obtained by combining the results obtained from individually color-converting the front side object 104 and the back side object 102 in the overprinting (or transparency processing) method will be different from the color obtained by color-converting a color synthesized prior to the color conversion due to the non-linearity of the color conversion.

Therefore, when the intermediate data for the three objects 100, 102 and 104 overlapped with each other as depicted in the light side of FIG. 2 is input, the overlap processing unit 16 produces a new object 110 that represents the overlap portion 108 superimposed by the overprinting (or transparency processing) method, as illustrated in FIG. 3. The object 110 is an object of an intermediate data format having the color value and geometrical information (shape, size and position in a page) of the overlap portion 108. In addition, the produced object 110 is inserted in the intermediate data of the page with the knock-out designation such that the object 110 is superimposed on the overlap portion 108 of the original two objects 102 and 104. Because the new object 110 has a color obtained by combining the colors of the original two objects 102 and 104 through the designated overprinting or transparency processing method, it is natural that the new object 110 will be turned to a correct color if the color conversion is performed when the flattening is performed thereto.

Meanwhile, because the overlap portion 106, in which the objects 100 and 102 are overlapped with each other with the knock-out designation, has a color which is the same as the color of the front side object 102, a color conversion problem, which occurs in the case of overprinting or transparency processing, is not caused from the start. Accordingly, for the overlap portion 106, for which the knock-out is designated, an object representing the overlap portion 106 is not produced.

Figure 4:
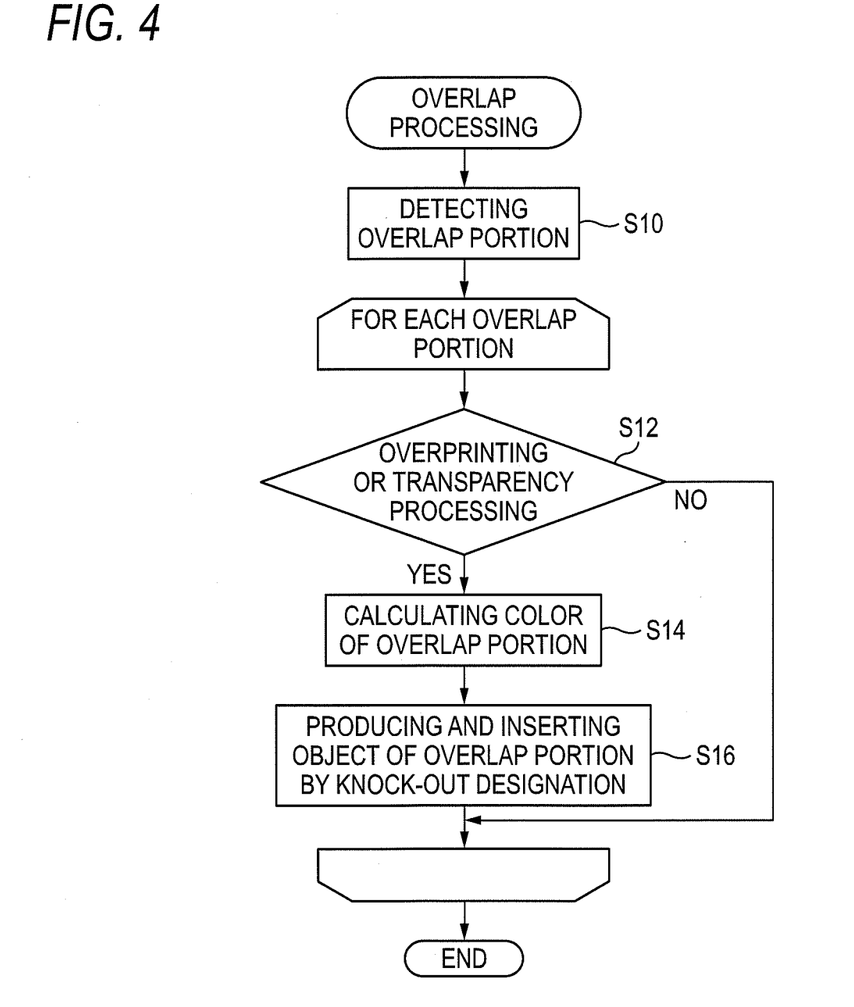
FIG. 4 is a view illustrating an example of a processing sequence of an overlap processing unit.

FIG. 4 illustrates an example of a processing sequence of the overlap processing unit 16. For example, this sequence is executed in relation to the intermediate data input from the intermediate data producing unit 12 for each page. In this sequence, first of all, an overlap portion between objects is detected from the intermediate data of the page (S10). Because the intermediate data contains geometrical information for each object in a page, the geometrical information of the overlap portion between the objects is obtained by comparing the information items. For example, in a case where the object are rectangular, two apexes of the left upper corner and right lower corner of a rectangular shape, which is the overlapping portion of these opposite side rectangular objects, are calculated based on the coordinates of two apexes of the left upper corner and right lower corner of each of the overlapped rectangular objects.

Here, in a case where the information of a bounding box of each object is contained in the intermediate data, it may be firstly determined whether the bounding boxes are overlapped with each other, and only when the bounding boxes are overlapped, an overlap portion between the objects included in the bounding boxes (the presence/absence of the overlap portion between the objects, and when the overlap portion between the objects is present, the geometrical information of the overlap portion) may be calculated in detail. When the bounding boxes are not overlapped with each other, the objects therein will not be overlapped with each other. Accordingly, it is not required to inspect the presence/absence of the overlap between the objects.

When overlap portions between the objects (hereinafter, simply referred to as "overlap portions") present in a page are extracted in this manner, the processing of S12 to S16 are executed for each of the overlap portions.

In S12, it is determined whether the overlapping method of objects in an overlap portion is an overprinting or a transparency processing. In a case where the overlapping method is a knock-out, the result of this determination is false (N). In such a case, the overlap processing unit 16 skips the processings of S14 and S16 for the overlap portion, and terminates the processing.

Meanwhile, in a case where the overlapping method is the overprinting or transparency processing, the color value of the overlap portion is calculated in S14. That is, in S14, the flattening of the overlap portion is performed. In this flattening processing, the color value of the overlap portion may be calculated by applying the colors of the front side and back side objects of the overlap portion to a calculation equation according to the overlapping method of the objects (the overprint or transparency processing).

Then, the overlap processing unit 16 produces a new object of an intermediate data format having the geometrical information of the overlap portion calculated in S10, and the color value of the overlap portion calculated in S14, and inserts the object in the intermediate data of the page by a designation that causes the object to be superimposed on the overlap portion and a knock-out designation (S16).

By the processings of S14 and S16, a new object representing a single overlap portion of the overprinting or transparency processing designation is added.

Although a case where two objects are overlapped with each other has been described above by way of an example, it is also possible to cope with an overlap portion between three or more objects by sequentially processing the overlapping portion by two objects in which the overlapping sequence is initiated from the back side. That is, for the overlap portion between three or more objects, the first and second objects are selected from the lowest object according to the overlapping sequence of the objects, and the processings of S12 to S16 are performed for the overlap portion between two objects. Here, when executing S14 and S16, a new object representing an overlap portion is added between the second object and the third object directly above the second object in the overlapping sequence with the knock-out designation. Next, the processings of S12 to S16 are executed for the newly added object and the third object, and when a new object representing an overlap portion of these two objects is produced as a result of executing the processings of S12 to S16, the new object is added between the third object and the fourth object directly above the third object in the overlapping sequence with the knock-out designation. By repeating the above-mentioned processings from the lowest object to the uppermost object, the overlap portion between three or more objects may be processed.

Meanwhile, although in the example of FIG. 4, an overlap portion is calculated in S10, and then it is determined whether the overlapping method of the objects in the overlap portion is an overprinting, a transparency processing, or a knock-out in S12, this is merely an example. Instead, the designation of the overlapping method given to an object may be firstly searched, and then for an object for which the knock-out is designated, no inspection may be made as to whether the object is superimposed on another object positioned therebelow in the overlapping sequence, and the overlap portion between the objects may not be calculated. In such a case, for a portion where the objects are overlapped with each other by the overprinting or the transparency processing, the geometrical information thereof is calculated. In addition, the processings of S14 and S16 may be executed only for the overlap portion.

Returning to the description of FIG. 1, intermediate data obtained as a result of processing of the overlap processing unit 16 is input to the color conversion unit 18. The color conversion unit 18 executes a color conversion for the intermediate data to adapt the intermediate data for a color space of the printer 30. That is, the intermediate data input to the color conversion unit 18 is data that has been represented in the color space of an environment where the original print data was prepared. The color conversion unit 18 converts the color value of the intermediate data to be adapted for the color reproducing characteristic of the printer 30 in such a manner that the color obtained as a result of printing in the printer 30 is turned to a color that is visually close to the color of the original print data reproduced in the original environment as much as possible. When color systems (RGB, CMYK, etc.) in the print data and the printer 30 are different from each other, a color system conversion is also performed in the color conversion.

The color conversion unit 18 performs a color conversion for a color value property of each object of the input intermediate data. Accordingly, the color conversion terminated intermediate data is output from the color conversion unit 18.

The flattening and color conversion terminated intermediate data output from the color conversion unit 18 is input to the raster producing unit 20. The raster producing unit 20 produces a raster image from the intermediate data. The conversion to the raster image may be conducted using a technology which is the same as an existing technology. In producing and processing the raster image, for each of the pixels of an overlapping portion between objects, the pixel value of the overlap portion is calculated by the calculating method according to a designated overlapping method.

For example, in the examples of FIGS. 2 and 3, from the back side in sequence, the object 100 is rasterized first, and then the object 102 which is the second from the back side is rasterized. In the rasterization of the object 102, because the knock-out is designated for the object 102, the color value of the object 102 is overwritten on a pixel in a portion in the back side object 100 which corresponds to that of the overlap portion 106 of both objects. Then, the object 104 is rasterized. Here, because the overprinting is designated for the object 104, the color value of each of the pixels of the overlap portion 108 of the objects 102 and 104 is turned to a color value in which the color values of both objects 102 and 104 are reflected. However, because the color value of the overlap portion 108 in this step is obtained by individually color-converting and then combining the color of each of the objects 102 and 104, the color value of the overlap portion 108 is likely to be somewhat deviated from the color of the overlap portion 108 represented by the original print data. In connection with this, in the present exemplary embodiment, the object 110 newly added on the object 104 is added with the knock-out designation. Because the color value of the object 110 is that obtained by calculating a color value in the case where the original two objects 102 and 104 are overlapped with each other and then color-converting the calculated color value, the color value of the object 110 is adapted to represent a color equal to the color of the overlap portion 108 represented by the original print data. By rasterizing the object 110 with the knock-out designation, a correct color value is overwritten above the overlap portion 108. Accordingly, a raster image having the correct color can also be obtained for the overprinting portion.

The processings of the intermediate data processing unit 14 and the raster producing unit 20 as described above only need to be conducted, for example, for each color plate and for each page.

The raster data produced by the raster producing unit 20 is supplied to a printer 30 through an output unit 22. The printer 30 controls a print mechanism (for example, an electro-photographic type or ink-jet print type engine) according to the raster data, thereby printing an image according to the raster data on a paper.

As described above, in the present embodiment, a new object representing an overlap portion between objects is generated and added above these objects by the knock-out designation. As such, because the new object, for which the knock-out is designated, is overwritten above the overlap portion between the original objects, it is not required to perform a change, for example, cutting off of the overlap portion from the two original objects.

Figure 5:
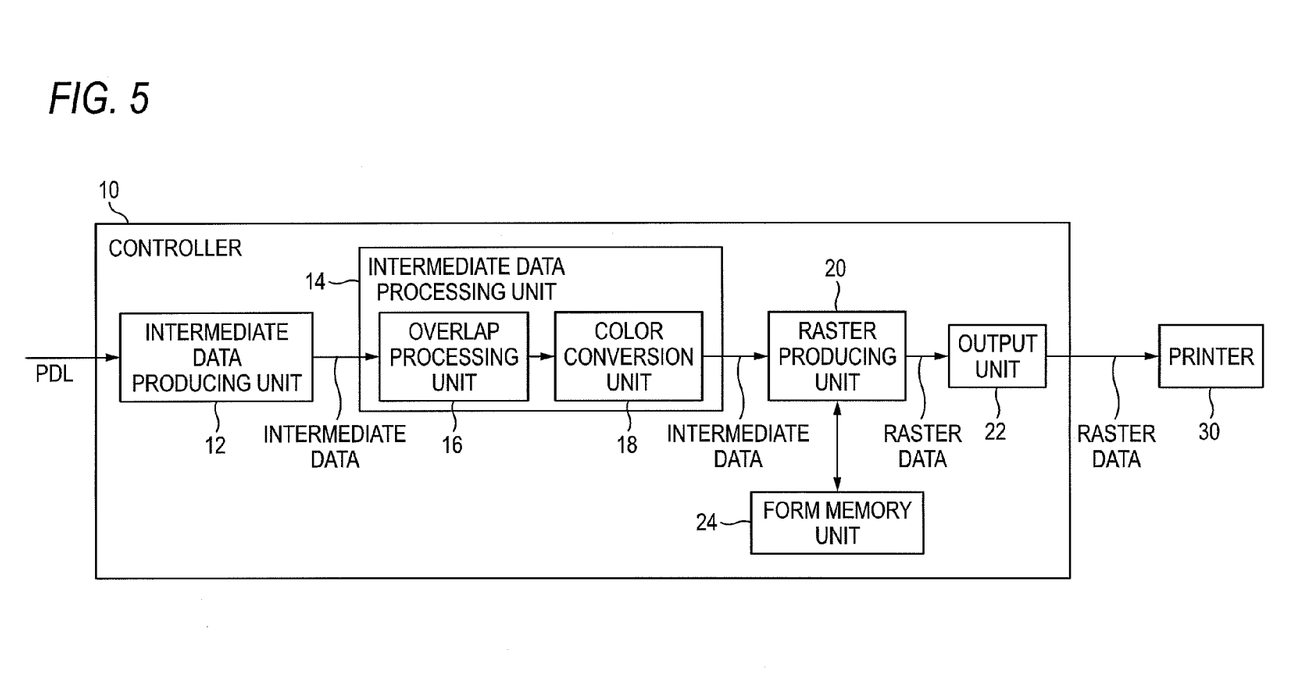
FIG. 5 is a view illustrating an example of system configuration of a modified example.

Next, a modified example for the above-described embodiment will be described. The modified example corresponds to a variable print using a regular format. FIG. 5 illustrates a system configuration of the modified embodiment.

The controller 10 illustrated in FIG. 5 is configured by adding a form memory unit 24, which is connected to the raster producing unit 20, to the controller 10 exemplified in FIG. 1. The components which are the same as those of FIG. 1 will be denoted by the reference numerals which are the same as those of FIG. 1.

In this embodiment, PDL print data to be input contains a plurality of pages including a common form of documents and variable data different from document to document. In general, the variable data and the form partially overlap on a page. In the present modified embodiment, when a plurality of documents using the same form are printed, the raster data of the form is prepared once and cached to be reused.

Each of the forms and the variable data includes one or more object. When a plurality of forms are used, a unique identifier (referred to as a "form ID") may be allocated to each form. In such a case, the data of a form in the PDL print data contains a form ID that specifies the form, and the form ID is also inherited to the intermediate data produced by the intermediate data producing unit 12 from the print data.

Figure 6:
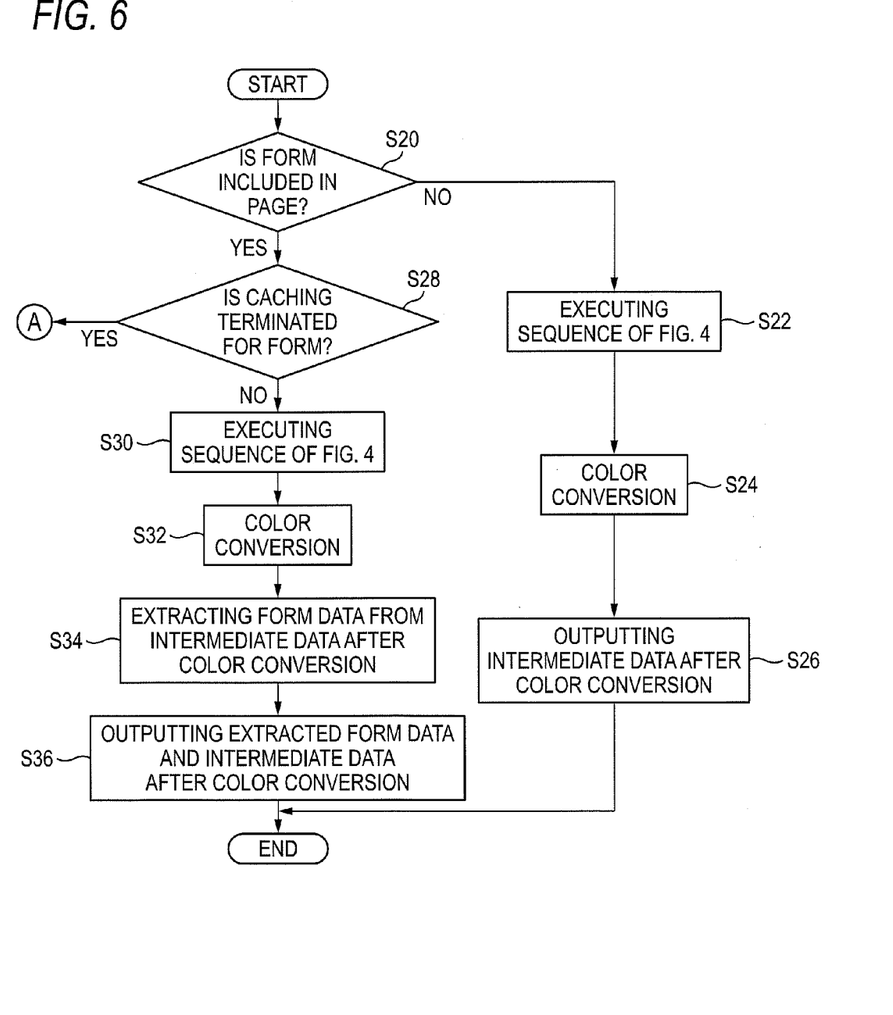
FIG. 6 is a view illustrating a part of an example of a processing sequence of an intermediate data processing unit of the modified example.
Figure 7:
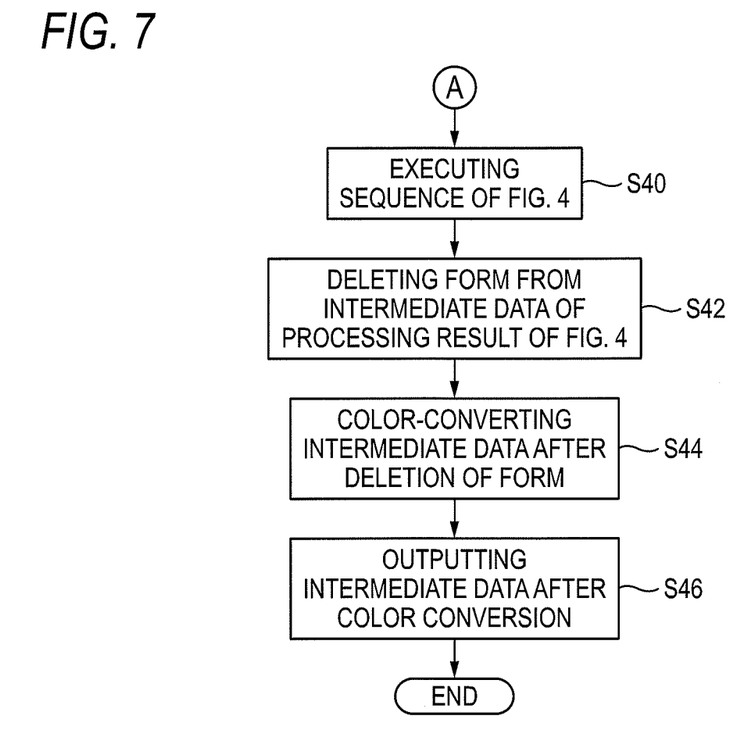
FIG. 7 is a view illustrating the remaining part of the example of the processing sequence of the intermediate data processing unit of the modified example.

An example of processing sequences of the intermediate data processing unit 14 in the present modified example is illustrated in FIGS. 6 and 7. The sequences of FIGS. 6 and 7 are executed for each intermediate data amounting to one-page input from the intermediate data producing unit 12. In these sequences, it is firstly determined whether a form is included in the page in the intermediate data or not (S20).

When it is determined that a form is not included, the intermediate data processing unit 14 performs a processing which is the same as the exemplary embodiment as described above. That is, the overlap processing unit 16 executes the processing sequence of FIG. 4 (S22), and the color conversion unit 18 executes a color conversion for the result of the processing (S24) and outputs the intermediate data of the page after the color conversion to a raster producing unit 20 (S26).

When it is determined that a form is included, the intermediate data processing unit 14 determines whether a caching of the form in the form memory unit 24 has already been terminated or not (S28). For this, for example, when a form ID is detected in the course of carrying on the sequential processings from the leading page, the intermediate data processing unit 14 may determine whether the detection has already been terminated or not, and when the detection has not yet been terminated, the intermediate data processing unit 14 may determine that a form corresponding to the form ID has not yet been cached, and at the same time, may memorize that the detection of the form ID is terminated.

When it is determined that the caching of the form has not been terminated in S28, the overlap processing unit 16 firstly executes the processing sequence of FIG. 4 (S30). In the result of this processing, objects belonging to the form are also included. Next, the color conversion unit 18 executes a color conversion for the processing result of the overlap processing unit 16 (S32).

Next, intermediate data processing unit 14 extracts a group of objects belonging to the form among the color conversion terminated intermediate data output from the color conversion unit 18 (S34). The extracted intermediate data of the object group of the form will be called "form data". Because in the color conversion terminated intermediate data, the back side object constituting the form is included with a shape remaining intactly as being regulated in the print data without being subjected to cutting-off of the overlap portion, as can be seen from the example of FIG. 3, the intermediate data of the objects of the form is extracted in S34. And, the intermediate data processing unit 14 outputs the form data extracted in S34 and the color conversion terminated intermediate data (including the objects of the form) produced by the color conversion unit 18 in step 32 to the raster producing unit 20 (S36).

When it is determined that the caching of the form has been terminated in S28, the overlap processing unit 16 firstly executes the processing sequence of FIG. 4 as illustrated in FIG. 7 (S40). In the result of this processing, the objects belonging to the form are also included. Next, the intermediate data processing unit 14 deletes the objects of the form from the processing result of the overlap processing unit 16 (S42), and the intermediate data remaining after the deletion (the intermediate data includes an object group of variable data and an object of the overlap portion newly added by the overlap processing unit 16) is color-converted in the color conversion unit 18 (S44). And, the intermediate data of the result of the color conversion is output to the raster producing unit 20 (S46).

Figure 8:
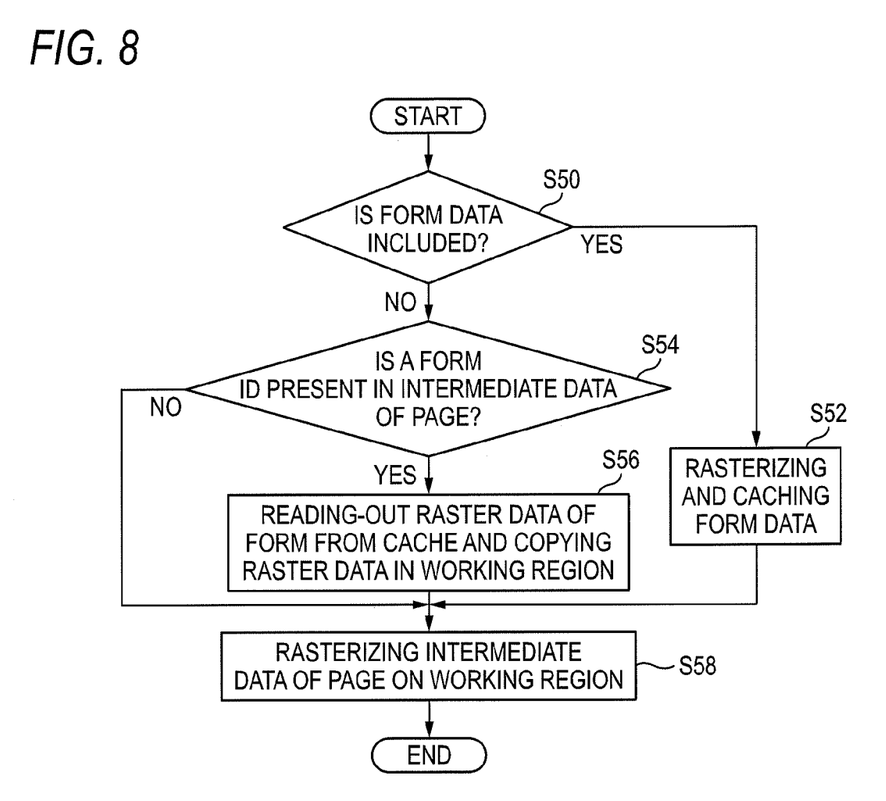
FIG. 8 is a view illustrating an example of a processing sequence of a raster producing unit of the modified example.

Next, an example of the processing sequence of the raster producing unit 20 will be described with reference to FIG. 8. The raster producing unit 20 determines whether the data received from the intermediate data processing unit 14 contains form data (S50). When the form data is contained, the raster producing unit 20 rasterizes the form data, and stores the raster data of the form obtained by the rasterization in the form memory unit 24 after making the raster data of the form correspond to the form IDs contained in the form data (S52). And, the intermediate data of a page contained in the data received from the intermediate data processing unit 14 (the intermediate data also includes forms) is rasterized on a working region secured in a memory (S58). The rasterized result is supplied to the printer 30 through the output unit 22.

When no form data is included in the received data, the intermediate data of a page included in the data is searched to determine whether the page uses a form or not (S54). Here, when a form ID (and a command to the effect that the form would be used) is included in the intermediate data of the page, it is determined that the page uses a form, and otherwise, it is determined that no form is used.

When it is determined that no form is used in S54, the raster producing unit 20 rasterizes the intermediate data of the page included in the data received from the intermediate data processing unit 14 (S58), and supplies the obtained raster data to the printer 30 through the output unit 22.

When it is determined that a form is used in step S54, the raster producing unit 20 copies the raster data of the form corresponding to the form ID contained in the intermediate data of the page to the working region secured on the memory from the form memory unit 24 (S56). And, the intermediate data of the page contained in the data received from the intermediate data processing unit 14 is rasterized (S58). Here, as the result of processing of S44 by the intermediate data processing unit 14, in the intermediate data of the page, the object of the form is not included and an object of variable data and an object of the overlap portion added with the knock-out designation by the overlap processing unit are included. For this reason, in S58, above the raster image of each of the objects of the forms already recorded on the working region, the raster data of the object of the variable data is recorded (i.e., the color value of each pixel is determined) according to a designation of the overlapping method, and furthermore, the raster image of the knock-out designated object of the overlap portion is overwritten. The raster data obtained by this processing is output to the printer 30 through the output unit 22.

As described above, in the present modified embodiment, when a form is used first, the form is rasterized and cached in the form memory unit 24, and from the second use, the cached raster data of the form is reused. Accordingly, after the second time, the rasterization of the form is not required.

In addition, in the present modified embodiment, when the same form is used after the second time, the intermediate data processing unit 14 deletes the form section from the processing result of the overlap processing unit 16. For this reason, the color conversion is not performed for the objects of the form, thereby alleviating the processing burden of the color conversion.

In the present modified embodiment, for a page where a form was used first, the intermediate data processing unit 14 extracts the object group of the form from the intermediate data of the results of color conversion of the page (S34) and transmits the object group of the form to the raster producing unit 20. However, this is merely an example. Instead of this, for a page where a form was used first, the intermediate data processing unit 14 may allow the page to be processed by the overlap processing unit 16 and the color conversion unit 18 (the result of this processing is intermediate data containing the form), and when the raster producing unit 20 rasterizes the intermediate data of the processing result, the intermediate data processing unit 14 may allow the raster data of the produced form to be cached in the form memory unit 24.

The controller 10 exemplified above (especially, the intermediate data processing unit 14 therein) is realized by executing a program representing the processing of each of the functional modules as described above, for example, in a general computer. Here, the computer has a circuit configuration in which as hardware, for example, microprocessors, such as a CPU, memories (primary memories), such as a random access memory (RAM) and a read only memory (ROM), a hard disc drive (HDD) controller for controlling an HDD, various I/O (input/output) interfaces, and a network interface for conducting a control for connection with a network, such as a local area network, are connected, for example, through a bus. In addition, to the bus, a disc drive for reading and/or recording a portable disc recording medium, such as a CD or a DVD, a memory reader and writer for reading from and/or writing into portable, nonvolatile recording mediums of various standards, such as a flash memory, etc. may be connected, for example, through the I/O interfaces. A program, in which the processing contents of the individual functional modules exemplified above are described, may be preserved in a fixed recording medium, such as a hard disc drive, to be installed in the computer via a recording medium, such as a CD or a DVD, or via a communication means, such as a network. The program stored in the fixed memory is read by a RAM and executed by a microprocessor, such as a CPU, thereby realizing the functional module group exemplified above. In addition, some or all of the functional modules in the controller 10 may be configured by a hardware circuit.

APPENDIX

An aspect of the exemplary embodiments described above may be grasped as an image processing apparatus as described below.

An image processing apparatus including:

an object adding unit, in which, when intermediate data expressing by geometrical information and a color value of each object includes a command to the effect that an overlapping object is overlapped on an overlapped object in an overlapping method in which the color value of the overlapped object is reflected to the color value of the overlap portion between the overlapped object and the overlapping object, the object adding module calculates the geometrical information of the overlap portion and the color of the overlap portion according to the overlapping method, and adds a command for overlapping an additional object having the calculated geometrical information and color value on the overlap portion by a knock-out method to the intermediate data; and a color conversion configured to conduct a color conversion for the colors of the overlapping object, the overlapped object, and the additional object in the intermediate data so that each of the colors is matched with a color space in the print apparatus, and to output the color conversion terminated intermediate data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an overlap portion detection unit that detects an overlap portion between plural objects from image data configured by objects expressed by geometrical information and color values;
    a color value calculation unit that for the overlap portion between the plural objects, calculates a color value of the overlap portion from the plural objects according to an overlap processing method of the overlap portion;
    an object producing unit that produces a new object from the overlap portion between the plural objects detected by the overlap portion detection unit, and the color value calculated by the color value calculation unit without cutting off the overlap portion between the plural objects; and
    a control unit that controls the object produced by the object producing unit to be superimposed on the overlap portion between the plural objects with a knock-out method.

2. The image processing apparatus according to claim 1, further comprising:
    a color conversion unit that conducts a color conversion for the objects in the image data and the object produced by the object producing unit to adapt each of the objects for a color space in a print apparatus, and outputs the result of color conversion of the color conversion terminated image data and the object produced by the object producing unit.

3. The image processing apparatus according to claim 1, wherein the color value calculation unit determines whether or not the overlap processing method of the overlap portion is one of an overprinting and a transparency processing.

4. An image processing apparatus comprising:
    an overlap portion detection unit that detects an overlap portion between plural objects from image data configured by objects expressed by geometrical information and color values;
    a color value calculation unit that for the overlap portion between the plural objects, calculates a color value of the overlap portion from the plural objects according to an overlap processing method of the overlap portion;
    an object producing unit that produces anew object from the overlap portion between the plural objects detected by the overlap portion detection unit, and the color value calculated by the color value calculation unit; and
    a control unit that controls the object produced by the object producing unit to be superimposed on the overlap portion between the plural objects with a knock-out method,
    wherein the image data includes a plurality of pages, each of which includes a regular object which is equal between the plurality of pages, and an irregular object which is not equal between the plurality of pages, the regular object and the irregular object having an overlap portion,
    wherein the image processing apparatus further comprises:
        a raster conversion unit that coverts the color conversion terminated image data output from a color conversion unit into raster data; and
        a caching unit that for the first page among the plurality of pages, caches the result of converting the regular object by the raster conversion unit,
    wherein for the first page among the plurality of pages, the raster conversion unit converts the regular object, the irregular object and the overlap portion object produced by the object producing unit into raster dater, superimposes the raster data of the result of converting the regular object and the raster data of the result of converting the irregular object one on another, and superimposes the raster data of the result of converting the overlap portion object on the overlapping result by a knock-out method, and at the same time, caches the result of converting the regular object by the raster conversion unit in the caching unit, and
    wherein for the pages after the second time among the plurality of pages, the raster conversion unit acquires the cached raster data of the regular object from the caching unit, and superimposes the acquired raster data of the regular object and the raster data obtained by converting the irregular object one on another, and the raster conversion unit superimposes the raster data obtained by converting the overlap portion object on the overlapping result by the knock-out method.

5. A non-transitory computer readable medium storing a program causing a computer to execute a process for image processing, the process comprising:
    detecting an overlap portion between plural objects from image data configured by objects expressed by geometrical information and color values;
    for the overlap portion between the plural objects, calculating a color value of the overlap portion from the plural objects according to an overlap processing method of the overlap portion;
    producing a new object from the detected overlap portion between the plural objects, and the calculated color value without cutting off the overlap portion between the plural objects; and
    controlling the produced object to be overlapped on the overlap portion between the plural objects with a knock-out method.

6. The image processing apparatus according to claim 4, further comprising:
    the color conversion unit that conducts a color conversion for the objects in the image data and the object produced by the object producing unit to adapt each of the objects for a color space in a print apparatus, and outputs the result of color conversion of the color conversion terminated image data and the object produced by the object producing unit.

7. The image processing apparatus according to claim 4, wherein the color value calculation unit determines whether or not the overlap processing method of the overlap portion is one of an overprinting and a transparency processing.

\* \* \* \* \*